US005646954A

United States Patent [19]
Das et al.

[11] Patent Number: 5,646,954
[45] Date of Patent: Jul. 8, 1997

[54] MAINTENANCE STRATEGY CONTROL SYSTEM AND MONITORING METHOD FOR GAS DISCHARGE LASERS

[75] Inventors: Palash P. Das, Vista; Gary R. Stephenson, San Diego, both of Calif.

[73] Assignee: Cymer, Inc., San Diego, Calif.

[21] Appl. No.: 599,744

[22] Filed: Feb. 12, 1996

[51] Int. Cl.⁶ ............................................. H01S 3/22
[52] U.S. Cl. ........................ 372/55; 372/25; 372/57; 372/61
[58] Field of Search ..................... 372/25, 29, 30, 372/33, 38, 55, 57, 58, 59, 61, 81, 108

[56] References Cited

U.S. PATENT DOCUMENTS

| | | | |
|---|---|---|---|
| 3,899,750 | 8/1975 | Hochuli | 372/61 X |
| 4,429,392 | 1/1984 | Yoshida et al. | 372/9 |
| 4,716,569 | 12/1987 | Bees | 372/38 |
| 4,740,982 | 4/1988 | Hakuta et al. | 372/59 |
| 4,763,336 | 8/1988 | Stephens | 372/81 |
| 4,977,573 | 12/1990 | Bittenson et al. | 372/81 |
| 5,090,020 | 2/1992 | Bedwell | 372/59 |
| 5,260,961 | 11/1993 | Zhou et al. | 372/57 |
| 5,377,215 | 12/1994 | Das et al. | 372/57 |
| 5,440,578 | 8/1995 | Sandstrom | 372/59 |

*Primary Examiner*—Brian Healy
*Attorney, Agent, or Firm*—David J. Power

[57] ABSTRACT

A diagnostic sub-routine for use by the control system of a gas discharge laser is disclosed. The sub-routine provides a prediction of the time remaining, based upon real-time laser system operations, for each pulse-limited sub-system within the laser. The sub-routine utilizes a calculated average pulse repetition rate over a user-defined time interval as the basis for predicting the time remaining, under current operating conditions, until the end-of-life for each pulse-limited sub-system; and continually updates the time prediction to account for changes in the lasers operation. The predicted time is reported to the operator to allow advanced scheduling of routine maintenance.

12 Claims, 2 Drawing Sheets

MAINTENANCE STRATEGY CONTROL SYSTEM AND MONITORING METHOD FOR GAS DISCHARGE LASERS

FIELD OF THE INVENTION

The present invention is related to gas discharge lasers, and particularly to a control system for predicting the time remaining until maintenance is required on various laser subsystems.

BACKGROUND OF THE INVENTION

Pulsed laser applications, such as materials processing, require a known amount of laser energy incident upon the material being processing. In most of these applications, process control is achieved by controlling the energy incident upon the surface of the material. Therefore, for such industrial applications, laser systems utilize all energy detector which measures the energy of each laser pulse. This energy information is communicated to the system user by the laser-based micro-controller, wherein the user can modify operating conditions to maintain constant laser energy or change the laser's energy to a new value.

Unlike lamps, which are discarded after use, gas discharge type lasers have to be maintained at specified intervals during use in a production environment, and the various subsystems must be refurbished due to contamination resulting from the various laser gasses reacting with the electrodes and chamber materials. This type of contamination, generally in the form of a metal fluoride dust in excimer laser systems, causes deterioration in the beam profile and bandwidth increases as a result of deposition and/or etching of the laser's windows. Erosion of the lasers electrodes during operation as a result of arcing and fluorine passivation in turn causes degradation of the laser's bandwidth, degradation of pulse-to-pulse energy stability, inconsistent burst mode behavior and degradation in beam profile. As the number of total pulses output by the laser increases during normal operation, sub-components such as the thyratron switch and the line narrowing modules likewise degrade in performance, resulting in less-than-expected energy output from the laser and an overall loss of process control. Typically, if the laser energy deviates too far from a user-specified range, the laser controller will terminate laser operation, thereby resulting in costly down-time for the user.

Industrial laser systems currently manufactured, have built in diagnostics to monitor system performance and help the user identify the cause of the laser's deteriorating performance. One such system is described in U.S. Pat. No. 5,377,215, assigned to the assignee of the present invention and specifically incorporated herein by reference as part of this disclosure. Diagnostics, such as those described in the '215 patent, utilize sensors placed in various critical locations within the laser; wherein the laser's micro controller continually monitors the inputs from these sensors and updates the memory locations used to store the individual inputs. These types of diagnostics provide a snapshot of the laser's status at the instant the sensory information is downloaded from memory, and are therefore limited to providing notice to the user once a problem occurs; they are not capable, however, of providing predictive information, based upon sub-component deterioration and sub-component end-of-life information, as to when a probable failure could occur.

SUMMARY OF THE INVENTION

The present invention is made in response to the above-referenced need for a predictive diagnostic which will allow users to schedule in advance the required maintenance on the laser's operation-limited sub-components, thereby preventing the degradation in laser output and the possible unscheduled downtime associated with sub-component failure. The present invention is particularly suitable for use in a manufacturing environment, but is equally well suited to other industrial and research environments which require the laser system to operate reliably and within critically defined parameters. In one aspect of the invention, a microprocessor based laser control system, such as that provided in the excimer laser system disclosed in the '215 patent, retains in its non-volatile memory a limit number or threshold pulse number for each pulse-limited sub-component used in the laser system. This limit number is based upon each sub-component's requirement for maintenance after a specified number of pulses is fired by the laser, with each sub-component having its own unique pulse-limit value. A pulse counter, which is used by the laser system for controlling other subsystems, such as a halogen injection system like that disclosed in the '215 patent, maintains a real-time count of the number of laser pulses fired by the system during operation. A sub-program, in accordance with the present invention, operates in conjunction with the control system diagnostics to compute a real-time difference between the user defined pulse-limit value and the current pulse count. The subprogram then determines an average pulse repetition rate over a user-specified time period, and uses this average value to calculate an accurate estimate, based upon the laser's current operation, of the time remaining before required maintenance (TBM) and/or end of the usable life of a sub-component, by dividing the real-time differences between the pulse-limit value and the pulse count by the computed average pulse rate value. This predicted time value, in hours or other specified time reference, is presented to the user upon user inquiry via the diagnostics, and is updated at either a fixed or a user-defined interval. As the laser's operation time reaches a predetermined level, an alert can be issued of the impending end-of-life of the sub-components, or an automated signal can be generated to shut-down the laser system.

DETAILED DESCRIPTION OF THE INVENTION

In the following description, a micro processor-based implementation of a predictive maintenance control system is described in terms of a gas discharge laser, and particularly an excimer laser. However, the predictive maintenance control system is equally adaptable to other pulsed laser systems having pulse limited sub-components, as well as other types of laser systems whose output can be converted to a time referenced and that incorporate sub-components having a specified TBM and/or end of useful life governed by the laser's output.

Figure 1:
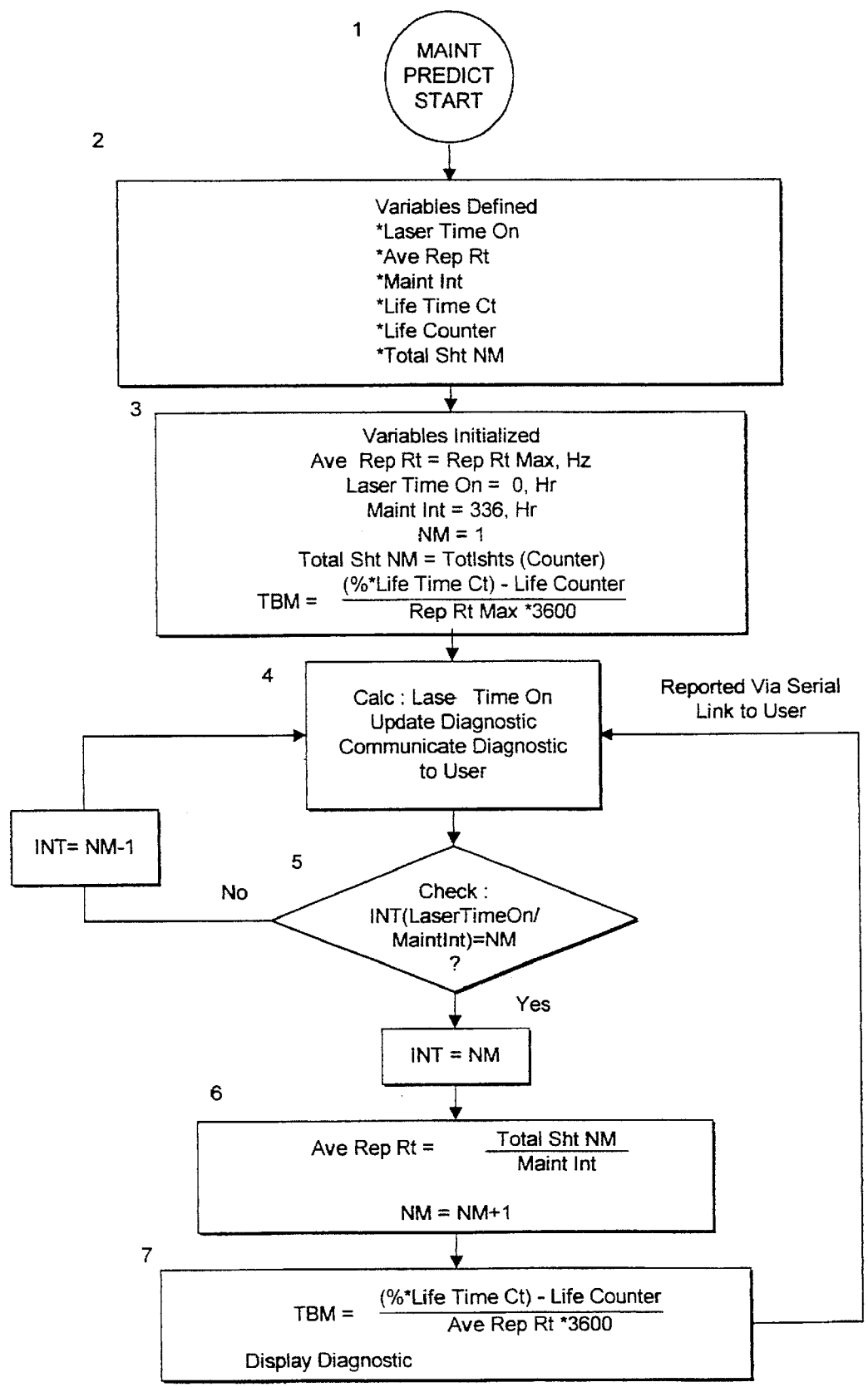
FIG. 1 depicts a flow chart schematically illustrating how the control system estimates the time remaining until TBM and/or the end of usable life for a particular laser sub-component.

The specifics of the predictive maintenance control system are shown in the flow chart shown in FIG. 1. The following paragraph are numbered to correspond to numbered steps in FIG. 1. For example, the paragraph numbered "3" below refers to the step numbered as "3" in FIG. 1. The numbers in FIG. 1 are to the left of the designated steps in the flowchart.

1. Maintenance prediction sub-program START initiates the diagnostic sub-program, allowing the user to predict and schedule required maintenance for laser system sub-components which have a specified operating life based upon the number of pulses fired by the laser. These components, for an excimer based system include the laser gas, chamber, high voltage power supply, metal fluoride filter, front and rear windows, commutator, compression head, front and rear optics, wave control meter and beam splitter. For example, the front and rear window components may have a useful life of 500 million pulse life before service is required, while the commutator may have a 3000 million pulse life.

2. Variables specific to the user's operation are defined. These are:

Laser Time On—the time the laser is in a powered state. This value is stored as a configurable in units of hours, in the control system's memory, and acts as a timer for the laser as it operates at a particular facility;

AveRepRt—the average pulse repetition rate in pulse/sec which is calculated in subsequent steps described infra;

MaintInt—the user-specified time period, over which AveRepRt is computed, such as hours, which is also stored as a Configurable in the control system's memory;

LifeTimeCt—the total pulses allowable for a particular component before its useful life ends and/or deterioration in performance will occur thereby triggering the need for servicing or replacement;

LifeCounter—the number of pulses fired by the laser system since maintenance was last performed on a component; and TotalShtNM—the total number of pulses fired by the laser system during the user specified time period MaintInt.

3. The defined variables are initialized. Each of the variables is linked in the sense that initializing one variable will affect, and therefore require initialization of the other variables. The time period for MaintInt is set, based upon the user's operational requirements, which is generally an established maintenance interval, such as two weeks (336 hours), specific to the user's manufacturing operation. When the laser system is first installed, LaserTimeOn can be initialized to zero. AveRepRt is initially set equal to the maximum pulse repetition rate for the laser system, RepRtMax, such as 1000 Hz. The Configurable RepRtMax is used for initialization when a viable AveRepRt cannot be computed. TotalShtNM is set to the value indicated by the pulse counter, TotalSht, which may be some value other than zero due to laser system testing at the manufacturer prior to shipment or pre-production operation. Dummy integer variable NM, used by the sub-program to determine when MaintInt is reached, as later explained, is set to an arbitrary integer, such as 1. Time-to-Maintenance, expressed in hours is, therefore, initially calculated as follows:

$$TBM = \frac{\Delta Pulse}{\frac{Pulse}{Sec} * \frac{3600}{Hr}}$$

this can be more easily expressed as:

$$TBM = \frac{(\% * LifeTimeCt - LifeCounter)}{RepRtMax * 3600}$$

where % is optionally set by the user to provide a lead time buffer before the components end of life is reached, such as 110%, to allow the control system to warn the user to prepare to service the component prior to the true TBM.

4. LaserTimeOn is down-loaded from the control system memory. Diagnostic information, including the most recent TBM estimate, is updated at a user-specified interval, either hourly or after a specified fraction of an hour, and communicated to the user via a Serial Interface.

Figure 2:
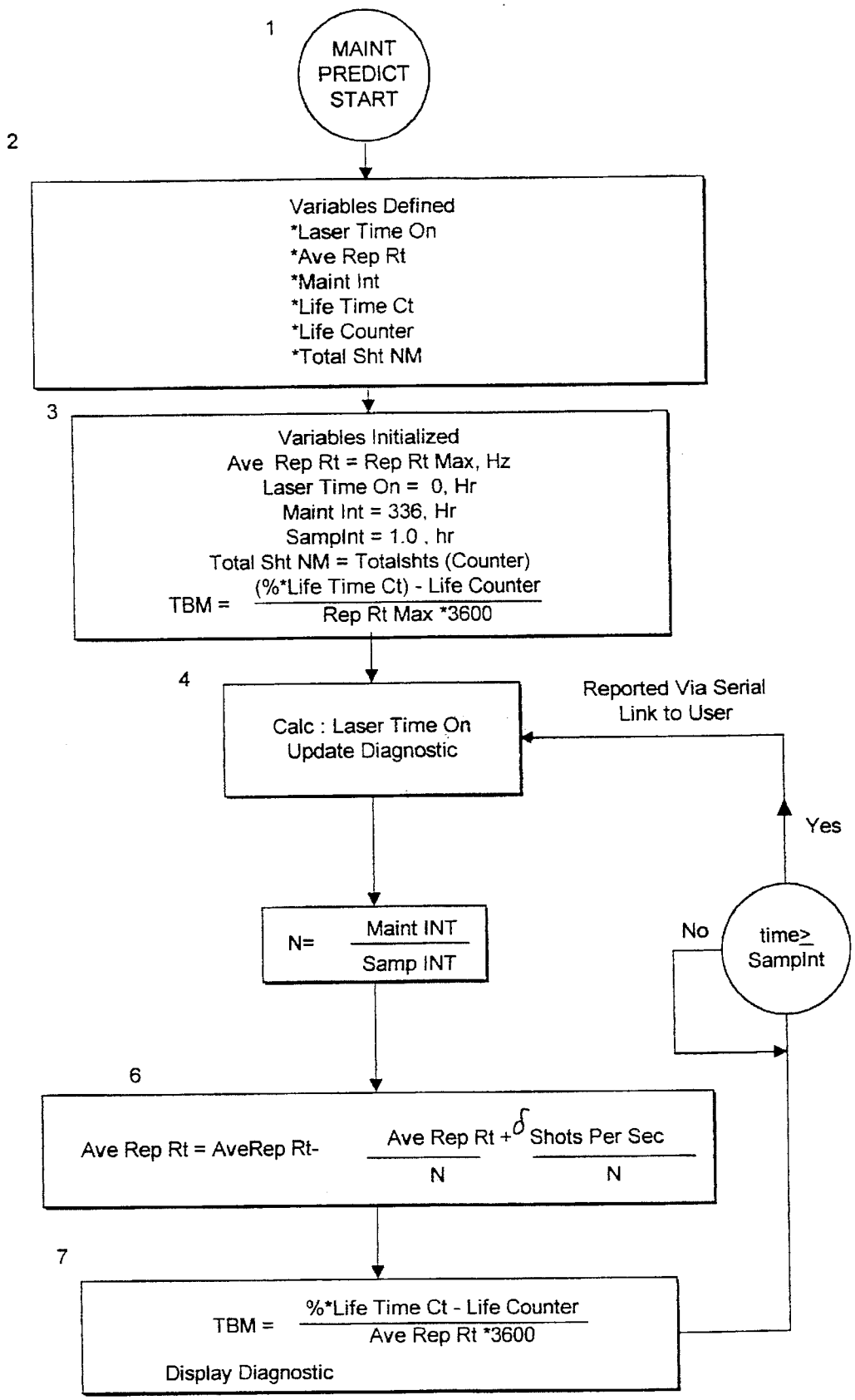
FIG. 2 depicts a flowchart schematically illustrating how the alternative embodiment, utilizing a rolling average of laser pulses fired over a sample interval, SampInt, estimates the time remaining until TBM and/or end of usable life for a particular laser sub-component.

5. The sub-routine CHECK is performed, as shown schematically in FIG. 2, where the program checks the value of INIT against the defined integer variable NM. As shown in FIG. 2, INT is defined as the ratio of the time the laser is in a powered state (LaserTimeOn) over the user-defined maintenance interval period (MaintInt). For example, with NM designated as a "1," and MaintInt specified as 336 hours, if the Configurable LaserTimeOn reads as 320 hours of operation, then the inquiry $320 \geq (1)$ (336), or $NM \geq 1$ (i.e., ratio of LaserTimeOn/MaintInt$\geq$, NM), is determined as "No" and INT is set at zero, wherein the program returns to step 4, and waits the user-defined interval to again recalculate LaserTimeOn. If, in the aforementioned example, LaserTimeOn was read as 365 hours, the relation $NM \geq$, 1 is true and INT would be set at 1. The program then proceeds to calculate AveRepRt as described in step 6.

6. Once the user-specified time interval (generally a production-established maintenance interval based upon an individual facility's operating schedule) MaintInt is reached, the average pulse repetition rate of the laser over the interval, AveRepRt, is calculated by taking the total number of pulses fired by the laser during the specified time interval divided by the interval period. The dock for measuring MaintInt will not advance when the laser is in a power-off state. The clock will continue to advance from its stopped position whenever the laser is in the LaserOn state. This calculation is based upon the following algorithm.

$$AveRepRt = \frac{TotalShtNM}{MainInt}$$

where the laser's running pulse counter will indicate TotalShtNM by the following relationship:

$$TotalSht = TotalSht + TotalShtNM$$

After the AveRepRt is calculated, the variable TotalShtNM is again initialized by setting TotalShtNM equal to the current total pulse count: TotalShtNM=TotalSht, and the dummy variable NM is set to NM=NM+1.

7. The TBM for the component is calculated as described in step 3; however the value AveRepRt is substituted for RepRtMax, as follows:

$$TBM = \frac{\% LifeTimeCt - LifeCounter}{AveRepRt * 3600}$$

TBM for a given MaintInt is, therefore, based upon the AveRepRt of the preceding MaintInt. This result is reported to the user via the serial interface and laser system diagnostics, as provided in step 4. Table 1 provides an exemplary listing of subsystem components for an excimer laser system for which TBM, as provided herein, is reported. Each item listed is identified by its configuration name, with the associated response string indicating the control system's response when a query via the serial interface, is issued by the user. This TBM response provides the user a predictive estimate of the time remaining before the respective sub-component will exceed its life limit, not its maintenance limit. The lifetime limit is signaled when the actual sub-component pulse count exceeds the life-pulse limit threshold for that sub-component. Because TBM is based upon the average pulse repetition rate of the laser system, it can be very different from actual time remaining if a large change is made to the programed repetition rate without initializing the defined variables. As previously discussed, it is for this reason that the variables are linked.

previously described; however, the AveRepRt is computed as a rolling average of laser pulses over a sample interval, SampInt (i.e. 6 minutes or 0.1 hours). In this alternative embodiment the previously discussed problems associated with changes in the laser's operating characteristics, and the impact of such changes on the calculation of the variable AveRepRt, is obviated. As shown in FIG. 2, step 5 is omitted, with AveRepRt being determined directly after LaserTimeOn is downloaded from the control system memory in step 4. The average pulse repetition rate in this embodiment is determined as follows:

$$AveRepRt = AveRepRt - \frac{AveRepRt}{N} + \frac{\delta \text{ Shots Per Sec}}{N}$$

where: δ Shots Per Sec is the repetition rate in pulses per second during a previous SampInt;

TABLE 1

Time-to-Maintenance (TBM) Items

| Sub-component Item by Configuration Name | Time-to-Maintenance Diagnostic Text | | Time-to-Maintenance Response String via Serial Interface |
| --- | --- | --- | --- |
| GasShts | D nn TBM Gas | nn.n Hr[1] | DIhh[2] = hhhh[3] |
| FWndShts | D nn TBM F Window | nn.n Hr | DIhh = hhhh |
| RWndShts | D nn TBM R Window | nn.n Hr | DIhh = hhhh |
| ChmbrShts | D nn TBM Chamber | nn.n Hr | DIhh = hhhh |
| FltrShts | D nn TBM Filter | nn.n Hr | DIhh = hhhh |
| FrntShts | D nn TBM F Optics | nn.n Hr | DIhh = hhhh |
| RearShts | D nn TBM R Optics | nn.n Hr | DIhh = hhhh |
| WCMShts | D nn TBM WCM Module | nn.n Hr | DIhh = hhhh |
| HVPSshts | D nn TBM HV Pwr | nn.n Hr | DIhh = hhhh |
| ComprShts | D nn TBM ComprsnHd | nn.n Hr | DIhh = hhhh |
| CommuShts | D nn TBM Commutator | nn.n Hr | DIhh = hhhh |
| BmSplShts | D nn TBM Split | nn.n Hr | DIhh = hhhh |

[1]The value in hours is "nn.n." If, for this example, the value exceeds 99.9 hours, it is displayed as 99.9 Hrs. Also note in the text "D nn" that "nn" represents the diagnostic number.
[2]The characters "hh" represent the number of the diagnostic in hexadecimal for example.
[3]The characters "hhhh" represent the data value in hexadecimal. For example a value of 0 will not be reported until the end of life has been exceeded.

It is to be noted that the subsystem GasShots is provided in Table 1. In addition to being pulse limited, the laser's gas is also limited by an actual time threshold, referred to as the static gas life. This time threshold can be set by a first gas Configurable (i.e., Static Lf), with the time since the last gas refill reported as a second gas Configurable (i.e., Static Tm). The time maintenance threshold for the gas can, for example, then be set by the user as a time at which Static Tm≧0.90 Static Lf, or some other percentage of StaticLf, and the life threshold for the sub-component be expressed as the point at which StaticTm>StaticLf. The TBM for gas life, prior to reaching the above-referenced threshold limits, would be reported in step 7 as the lesser of:

(a) $\frac{GasShots}{AveRepRt}$, or (b) Static Life Remaining = (Static $Lf$ + 1) − Static $Tm$ When a subsystem component reaches its lifetime limit threshold, the control system can be configured to automatically transition from a state in which the laser can be fired to a standby state, or it can be configured to continue to operate while providing repeated alert messages to the user that the output characteristics of the laser may have degraded and the subsystem failure is imminent.

In an alternative embodiment of the present invention, steps 1 to 4 are performed by the laser's control system as 1/N is the weighting factor, based upon the designated sample interval, assigned to δ Shots Per Sec, and is computed in each sample interval, SampInt. The variable "N" is related to the Configurable MaintInt, when MaintInt is in hours and SampInt in hours, as follows:

$$N = \frac{MaintInt}{SampInt}$$

for example, if SampInt is set for 0.1 Hr (6 min), then N=10 * MaintInt.

In this alternative embodiment AveRepRt is itself an averaged value which is computed each SampInt period, which in the aforementioned example was specified as 6 min. For example, if the maintenance interval, MaintInt, is specified at 24 hours, and the sample interval, SampInt, is specified as 0.1 hour (6 min) as previously described; and AveRepRt is equal to RepRtMax (1000 pulses/sec), with the pulses per second in the previous SampInt, δ set at 100 then:

$$AveRepRt = \frac{1000}{sec} \text{pulses} - \frac{1}{240}\left(\frac{1000 \text{ pulses}}{sec} + \frac{100 \text{ pulses}}{sec}\right)$$

$$= \frac{1000 \text{ pulses}}{sec} - \frac{3.75 \text{ pulses}}{sec} = \frac{996.25 \text{ pulses}}{sec}$$

8. The estimated TBM is calculated for each sub-component based upon the current AveRepRt for the laser system, by taking the difference between a user-specified percentage or LifeTimeCt (i.e., 110%) for the sub-component and of LifeCounter. This difference is divided by AveRepRt and converted to a user-friendly time frame, such as hours, as follows:

$$TBM = \frac{0.90 \, LifeTimeCt - LifeCounter}{AveRepRt} \times \frac{Hr}{3600 \, Sec}$$

Therefore, if the user queries the laser control system diagnostics as to the TBM for a sub-component having a LifeTimeCt=300 million pulses, with LifeCounter=100 million pulses, and AveRepRt as provided in step 6, the read-out provided would be:

$$TBM = \frac{0.90(300 \times 10^6) - (100 \times 10^6)}{\frac{996.25 \, Pulses}{Sec}} \times \frac{Hr}{3600 \, Sec}$$

$$= 64.13 \, Hrs.$$

Although the invention has been disclosed and illustrated with reference to particular embodiments (i.e., an excimer laser system), the principals involved are susceptible for use in numerous other embodiments which will be apparent to persons skilled in the art. The invention is, therefore, to be limited only as indicated by the scope of the appended claims.

What is claimed is:

1. A laser system comprising a set of service life-limited sub-components operating in combination to generate an output laser beam, and a control system operatively coupled and in communication with each sub-component to monitor and control each sub-component's operation and collectively monitor and control the output of the laser system, said monitoring function further including a generation of a predictive end-of-life signal to produce a readout to the operator of a time remaining under current laser system operation for each service life-limited sub-component.

2. The laser system of claim 1 wherein the laser system is a gas discharge laser system.

3. The laser system of claim 2 wherein the gas discharge laser system is an excimer laser.

4. The laser system of claim 1 wherein the predictive end-of-life signal is a function of an output of the laser system over a user specified time period, a known service life for each sub-component and a current operation time of the laser system.

5. The laser system of claim 4 wherein the laser output is a pulsed output.

6. The laser system of claim 3 wherein the predictive end-of-life signal is a function of a number of pulses generated by the laser over a user-specified interval, a known pulse-limited service life for each sub-component, and a current pulse output count for the laser.

7. The laser system of claim 6 wherein the number of pulses generated is an averaged value of a pulse count over a user specified interval.

8. A method for predicting an end-of-service life for pulse-limited sub-components of a gas discharge laser system comprising the steps of:

determining an initial pulse count for the laser system;

establishing a maximum pulse limit for each sub-component;

defining a maintenance interval, said maintenance interval being operator-specified based upon a laser operation schedule;

determining a pulse count for said maintenance interval, said pulse count being the difference between a final pulse count at the end of the maintenance interval and the initial pulse count;

calculating an average pulse repetition rate over said maintenance interval by dividing said interval pulse count by said maintenance interval;

determining a time remaining under current laser operation until the end-of-life for each sub-component by dividing a difference between the maximum pulse limit and the final pulse count by said average repetition rate.

9. The method of claim 8 wherein the gas discharge laser is an excimer laser.

10. A method for predicting an end-of-life for pulse-limited sub-components of a gas discharge laser system comprising the steps of:

establishing a maximum pulse limit for each sub-component;

defining a maintenance interval, said maintenance interval being operator-specified based upon a laser operation schedule;

defining a pulse sample interval, said sample interval being a subset of the maintenance interval;

determining an average pulse repetition rate for said maintenance interval by calculating a rolling average of said laser system's pulse repetition rate over each sample interval;

determining a time remaining until the end-of-life for each sub-component by dividing a difference between the maximum pulse limit and a final pulse count by said average pulse repetition rate.

11. The method of claim 10 wherein the average pulse repetition is a weighted average utilizing a weighing factor based upon a ratio of the maintenance interval and the sample interval.

12. The method of claim 10 wherein the gas discharge laser system is an excimer laser.

* * * * *